(12) United States Patent
Backer et al.

(10) Patent No.: US 10,047,329 B2
(45) Date of Patent: Aug. 14, 2018

(54) WATER DISPERSIBLE FILMS FOR PACKAGING HIGH WATER CONTAINING FORMULATIONS

(71) Applicant: ROHM AND HAAS COMPANY, Philadelphia, PA (US)

(72) Inventors: Scott Backer, Philadelphia, PA (US); Afia S. Karikari, Bristol, PA (US); Paul Mercando, Pennsburg, PA (US)

(73) Assignee: Rohm and Haas Chemicals LLC, Philadelphia, PA (US)

( * ) Notice: Subject to any disclaimer, the term of this patent is extended or adjusted under 35 U.S.C. 154(b) by 78 days.

(21) Appl. No.: 15/024,015

(22) PCT Filed: Sep. 25, 2014

(86) PCT No.: PCT/US2014/057422
§ 371 (c)(1),
(2) Date: Mar. 22, 2016

(87) PCT Pub. No.: WO2015/048266
PCT Pub. Date: Apr. 2, 2015

(65) Prior Publication Data
US 2016/0244701 A1 Aug. 25, 2016

Related U.S. Application Data

(60) Provisional application No. 61/883,757, filed on Sep. 27, 2013.

(51) Int. Cl.
*C08F 210/02* (2006.01)
*C11D 17/04* (2006.01)
*C08L 23/08* (2006.01)
*C11D 3/395* (2006.01)

(52) U.S. Cl.
CPC .......... *C11D 17/043* (2013.01); *C08F 210/02* (2013.01); *C08L 23/0869* (2013.01); *C11D 3/3956* (2013.01); *C11D 17/045* (2013.01)

(58) Field of Classification Search
CPC ... C11D 3/3746; C11D 3/3757; C11D 17/043; C08L 23/0869; C08F 210/02
See application file for complete search history.

(56) References Cited

U.S. PATENT DOCUMENTS

| | | |
|---|---|---|
| 3,267,083 A | 8/1966 | Imhof |
| 3,355,319 A * | 11/1967 | Rees ............... B29C 63/00 428/349 |
| 3,472,825 A | 10/1969 | Walter |
| 4,692,494 A | 9/1987 | Sonenstein |
| 6,162,852 A | 12/2000 | Honeycutt |
| 6,166,117 A | 12/2000 | Miyazaki |
| 6,482,517 B1 | 11/2002 | Anderson |
| 6,660,704 B1 | 12/2003 | Waschenbach |
| 6,727,216 B1 | 4/2004 | Guido Waschenbach |
| 7,022,656 B2 | 4/2006 | Verrall |
| 7,745,517 B2 | 6/2010 | Vicari |
| 2002/0081930 A1 | 6/2002 | Jackson |
| 2002/0098326 A1 | 7/2002 | Sato |
| 2003/0096910 A1 | 5/2003 | Soerens |
| 2003/0158072 A1 | 8/2003 | Goodson |
| 2003/0220042 A1 | 11/2003 | Lostocco |
| 2004/0110891 A1 | 6/2004 | Guo |
| 2006/0258553 A1 | 11/2006 | Catalfamo |
| 2007/0142542 A1 | 6/2007 | Morris |
| 2009/0298712 A1 | 12/2009 | Kiryukhin |
| 2011/0206632 A1 | 8/2011 | Kappock |
| 2012/0024348 A1 | 2/2012 | Prejean |
| 2012/0108491 A1 | 5/2012 | Simonsen |
| 2013/0065811 A1 | 3/2013 | Fernandez-Prieto |

FOREIGN PATENT DOCUMENTS

| | | |
|---|---|---|
| CA | 2416464 | 7/2003 |
| CA | 2475921 A1 | 8/2003 |
| CA | 2651361 A1 | 1/2008 |
| CA | 2405736 A1 | 11/2011 |
| EP | 0558188 A1 | 9/1993 |
| EP | 1386959 A1 | 2/2002 |
| EP | 1234854 A1 | 8/2002 |
| EP | 1331262 A1 | 7/2003 |
| EP | 1364610 A1 | 11/2003 |
| EP | 1384771 A1 | 1/2004 |
| EP | 1428867 B1 | 8/2007 |
| EP | 1958991 A2 | 8/2008 |
| EP | 2135933 A1 | 12/2009 |
| EP | 2392543 A1 | 12/2011 |
| EP | 2399978 A1 | 12/2011 |
| GB | 1291019 A | 9/1972 |

(Continued)

OTHER PUBLICATIONS

K.T. Chong et al., "Polyethylene-co-acrylic Acid as Coating for Biosensor Application: A Quartz Crystal Microbalance Study," 2002, Langmuir, 18: 9932-9936.
K. Koschorreck et al., "Improving the functional expression of a Bacillus licheniformis laccase by random and site-directed mutagenesis," 2009, BMC Biotechnology, 9:12.
A.M. Mayer et al., "Laccase: new functions for an old enzyme," 2002, Phytochemistry, 60:551-565.
X. Su et al., "Enzyme immobilization on polyethylene-co-acrylic acid) films studied by quartz crystal microbalance with dissipation monitoring," 2005, J Colloid Interf Sci, 287:35-42.
C.F. Thurston, "The structure and function of fungal laccases," 1994, Microbiology, 140:19-26.
P. Zhang et al., "Rapid SLT Gene Detection on Polyethylene-Coacrylic Acid Film without Molecular Labels or Surface-Fouling Agents," 2000, Anal. Biochem., 282:218-226.

(Continued)

*Primary Examiner* — Brian P Mruk
(74) *Attorney, Agent, or Firm* — McDonnell Boehnen Hulbert & Berghoff LLP

(57) ABSTRACT

A composition comprising an ethylene (mem)acrylic acid copolymer and a crosslinking agent is provided. The composition is able to form a film composition, which selectively disintegrates in media with high water content, depending on the ionic strength of the media.

14 Claims, No Drawings

(56) References Cited

FOREIGN PATENT DOCUMENTS

| | | | |
|---|---|---|---|
| GB | 2375542 A | 11/2002 |
| GB | 2387602 A | 10/2003 |
| MX | PA03011211 A | 8/2004 |
| WO | WO1989010117 A1 | 11/1989 |
| WO | WO1997000275 A2 | 1/1997 |
| WO | WO2000006505 A1 | 2/2000 |
| WO | WO2000038751 A1 | 7/2000 |
| WO | WO2001034939 A1 | 5/2001 |
| WO | WO2001083867 A2 | 11/2001 |
| WO | WO2002017888 A2 | 3/2002 |
| WO | WO2002042342 A2 | 5/2002 |
| WO | WO2002079270 A2 | 10/2002 |
| WO | WO2002092751 A2 | 11/2002 |
| WO | WO2003016455 A1 | 2/2003 |
| WO | WO2004046299 A1 | 6/2003 |
| WO | WO2004046300 A1 | 6/2004 |
| WO | WO2005028603 A1 | 3/2005 |
| WO | WO2009135098 A1 | 11/2009 |
| WO | WO2010003934 A1 | 1/2010 |
| WO | WO2010015493 A1 | 2/2010 |
| WO | WO2010024348 A1 | 3/2010 |
| WO | WO2012083478 A1 | 6/2010 |

OTHER PUBLICATIONS

PCT/US2014/057436, International Search Report and Written Opinion, dated Dec. 8, 2014.
PCT/US2014/057436, Notification of Transmittal of the International Preliminary Report on Patentability, dated Nov. 5, 2015.
PCT/US2014/057422, Written Opinion and International Search Report, dated Oct. 30, 2014.
PCT/US2014/057422, International Preliminary Report on Patentability and Written Opinion, dated Mar. 29, 2016.
PCT/US2014/057441, International Search Report and Written Opinion, dated Jan. 15, 2015.
PCT/US2014/067087, International Search Report and Written Opinion, dated May 6, 2015.
PCT/US2014/067087, International Search Report and Written Opinion, dated May 31, 2016.
PCT/US2014/057441, International Preliminary Report on Patentability and Written Opinion, dated Mar. 29, 2016.

* cited by examiner

WATER DISPERSIBLE FILMS FOR PACKAGING HIGH WATER CONTAINING FORMULATIONS

CROSS REFERENCE TO RELATED APPLICATIONS

This application claims priority to International Patent Application No. PCT/US2014/057422, filed Sep. 25, 2014, which claims priority to U.S. Provisional Application No. 61/883,757, filed Sep. 27, 2013, all of which are hereby incorporated herein by reference in their entireties.

FIELD

This disclosure relates to compositions that selectively disintegrate when in contact with formulations with high water content, depending on the ionic strength of the formulations.

BACKGROUND

Water dispersible films are useful in many applications. In the household and industrial markets, the use of water dispersible films in unit dose delivery systems provide several benefits for consumers including ease and convenience of use, low cost, and increased safety for the user due to a reduction in exposure to chemicals present in cleaning formulations. Much of the art of packaging unit dose detergents relates to the development of the water dispersible film package. Presently, water dispersible packaging films based on vinyl alcohol-vinyl acetate copolymers, or more commonly known as partially hydrolyzed polyvinyl alcohol homopolymers (PVOH) and its copolymers with alkyl cellulose compounds and carboxylic acids have remained the predominant film technology due to their rapid water dispersibility.

Liquid laundry detergent compositions are usually formulated with high water content of about 70 to 90 weight percent of water. The use higher water content possesses several advantages, including faster delivery and dispersibility of the formulation ingredients. Currently, however, the water dispersible unit dose pouch or packets fabricated for packaging unit dose liquid laundry detergents are unsuitable for packaging liquid laundry detergents with high water content. In fact current unit dose liquid laundry detergents packaged in PVOH-based water dispersible pouch or packets are highly concentrated heavy-duty liquid formulations with low levels of water contents in an amount of about 10 to 24 weight percent of water. In these formulations, the use of low water content is strictly limited to about 10 weight percent of water to ensure compatibility of the liquid detergent with the water dispersible pouch and prevent premature dissolution and breakdown of the pouch. Due to the low water content, liquid unit dose systems require higher amounts of organic solvent system compared to their liquid laundry detergents counterparts. The use of higher amounts of organic co-solvent such as propylene glycol, ethylene glycol, or glycerine and their combinations allows improved processing and compatibility of the liquid detergent and the packaging film. These solvents unfortunately add cost to the detergent formulation without providing any additional cleaning benefit.

Another key ingredient in liquid detergent formulations is organic neutralizers, such as alkalis. Alkalis are most commonly used in laundry detergents to provide the appropriate pH and high alkalinity. The most effective alkalis in laundry detergents are sodium and potassium salts of silicates, carbonates, and hydroxides. These are typically preferred due to their effectiveness in providing improved soil and dirt removal, and preventing redeposition. In the current unit dose liquid detergents however, the use of organic alkalis are especially problematic due to the incompatibility with the PVOH-based packaging film. Consequently, organic amines such as monoethanol amine are typically used as the neutralizer of choice, further adding cost to the unit dose detergent system.

There is therefore a need for film compositions useful for the fabrication of unit dose articles for packaging liquid formulations with high water content from about 10 to about 95 weight percent of water.

BRIEF SUMMARY

In one aspect, a composition is provided comprising an ethylene (meth)acrylic acid copolymer, wherein at least a portion of the carboxylic acid groups on the copolymer are neutralized; and a crosslinking agent. The ratio of the ethylene component to the (meth)acrylic acid component is between about 50:50 to 90:10 and the composition does not disintegrate in media having a pH of between about 8 and 13 and comprising about 10 percent to about 95 weight percent water.

In another aspect, a unit dose form is provided, comprising a film composition comprising an ethylene (meth)acrylic acid copolymer and a crosslinking agent, wherein at least a portion of the carboxylic acid groups in the (meth)acrylic acid component are neutralized, wherein the ratio of the ethylene component to the (meth)acrylic acid component is between about 50:50 to 90:10. The unit dose form also comprises media having a pH of between about 8 and 13 and comprising about 10 percent to about 95 weight percent water in contact with the film composition.

In yet another aspect, a unit dose form is provided, comprising a first film composition comprising an ethylene (meth)acrylic acid copolymer and a crosslinking agent and a second film composition comprising an ethylene (meth) acrylic acid copolymer and a crosslinking agent. The unit dose form also comprises a first media in contact with the first film composition, wherein the first media comprises about 10 percent to about 95 weight percent water and a second media in contact with the second film composition, wherein the second media comprises about 10 percent to about 95 weight percent water.

DETAILED DESCRIPTION

The present disclosure provides water dispersible compositions useful for the fabrication of articles for packaging aqueous-based unit dose laundry compositions with high water contents of about 25 to about 70 weight percent or higher. As used herein, the term "composition" may mean, for example, a mixture, solution, or dispersion. In certain embodiments, the laundry compositions are substantially free of organic solvent systems or compatibilizers. The water dispersible films of the present disclosure may be prepared from a composition comprising an ethylene (meth) acrylic acid copolymer. In other embodiments, the films may be prepared from a composition comprising a metallocene catalyzed polyolefin or a combination of a metallocene catalyzed polyolefin and an ethylene (meth)acrylic copolymer. The preferred polymeric films suitable for use in the present disclosure are prepared from highly neutralized composition of lower molecular weight ethylene (meth)

acrylic acid copolymers with high (meth)acrylic acid content of 10 to 20 percent more commonly known as ionomers. Such compositions may be formed any number of methods known to those of skill in the art.

Ethylene (meth)acrylic acid (EAA) copolymers can be used in a wide variety of applications including high-performance adhesives, flexible packaging films, pouches and in extrusion coating and extrusion lamination applications. "(Meth)acrylic", as used herein, means acrylic, methacrylic, or mixtures thereof. The free acid form of ethylene (meth)acrylic acid copolymers can be neutralized to the desired degree with a suitable base. Ethylene (meth)acrylic acid copolymers can be obtained with varying water dispersibility depending on the degree of neutralization. For example, complete water dispersibility, or under certain conditions, complete water solubility, is obtained when the (meth)acrylic acid moiety is completely neutralized with a stoichiometric amount of base whereas partially neutralized EAA copolymers can be water dispersible, water sensitive, or water insensitive depending on the application for which it is aimed.

Here, the EAA copolymers are first neutralized with a monovalent base. The neutralization may be followed by a second crosslinking step where a portion of the remaining (meth)acrylic acid may be ionically crosslinked with a divalent cation such as zinc. In some embodiments, the (meth)acrylic acid moiety are completely or partially neutralized with the monovalent base and contain certain additives, disintegrating agents, and water dispersible polymers to improve dispersibility and mechanical properties of the resulting casted films.

The use of packaging film with tolerance for high water content in the liquid detergent formulation, as well as increased compatibility with inorganic neutralizers will provide a cost effective alternative to current PVOH-based packaging films. In addition, the films of the present disclosure should provide shelf-lives superior to PVOH-based films. PVOH films stored at low temperature and low humidity environments for longer periods become too brittle with significant loss in critical mechanical properties such as tear strength. Conversely, when stored at high temperature and high humidity conditions, the PVOH films become too soft and tacky to handle. Furthermore, the degree of hydrolysis of PVOH films increases significantly at high temperature and high humidity conditions, hence, the films lose water dispersibility, and may become completely indispersible if fully hydrolyzed. The packaging films presented herein are expected to provide improved moisture resistance compared to PVOH-based packaging films.

Aqueous compositions of highly neutralized ethylene (meth)acrylic acid can be used to generate freestanding dispersible ionomer films via solution casting methods. The water dispersible film composition of the present disclosure consists of highly neutralized ethylene (meth)acrylic acid ionomers that are lightly crosslinked with a polyvalent cation such as zinc (present in a crosslinking agent, for example, zinc oxide). The films are transparent, non-tacky, and heat sealable. Preferred copolymers are ionomer compositions based on functionalized polyolefins with (meth) acrylic acid content ranging from 10 to 20 percent, where the (meth)acrylic acid component is neutralized to at least about 70 to about 95 percent with a hard base such as sodium hydroxide or potassium hydroxide, and is further lightly crosslinked with a polyvalent cation such as $Ca^{2+}$, $Mg^{2+}$, $Al^{3+}$, or $Zn^{2+}$. In this embodiment, the crosslinking agent containing the polyvalent cation is present in a concentration of about 0.1 to 2 weight percent, preferably 0.2 to 1 weight percent, more preferably 0.3 to 0.5 weight percent, and most preferred 0.4 weight percent of the film composition.

The temperature at which the films are dried or annealed after casting on glass plate significantly affects whether the films disintegrate in hot or cold water or both. Cast films dried in forced air oven at 40 degrees Celsius break and disintegrate quickly in cold water (i.e., water at a temperature of less than about 10 degrees Celsius), whereas films dried at 60 degrees Celsius are only dispersible in hot water (i.e., water at a temperature of greater than about 45 degrees Celsius). The water dispersible films are stable during storage over a wide range of temperatures and humidity. Thus, a method is provided for fabricating the films in order to retain cold-water dispersibility and provide improved stability.

The addition of water soluble plasticizers and additives provides improved film formation, however, also results in a slight increase in overall film disintegration time. On the other hand, the addition of hydrophobic film forming aids, such as plasticizers, and additives provides the right balance of improved film formation and fast film break and disintegration.

The water dispersible films of the present disclosure are very stable. Such films are not dispersible and maintain their shape at high pH and in high ionic strength water-containing formulations (e.g., having a water content of 70 to 95 weight percent of water and no co-solvent and/or organic plasticizers). Specifically, when immersed in aqueous-based formulations where the ionic strength is sufficiently high and the pH is between 8 and 13, the films of the present disclosure remain intact. The films, however, break and disintegrate when the high pH/high ionic strength water-based formulation is replaced with a low ionic strength formulation such as tap water. The term "disintegrate," as used herein, means dissolve, disperse, or to be soluble. Examples of such high water/high ionic strength formulations include current liquid laundry detergents containing approximately 70 weight percent water, household hypochlorite bleach solution containing 90 to 95 weight percent water, and saturated sodium chloride solution containing 70 weight percent water.

The water dispersible films may comprise at least one water dispersible layer, depending on the processing conditions and the proposed end use. For example, for cold water washing applications requiring rapid and complete dispersibility of the packing film to release the contents, a single layer of film dried at about 40 degrees Celsius can be used to fabricate the pouch, while a layer of film processed at about 50 to 60 degrees Celsius can be used for a hot water wash requiring rapid and complete film dispersibility. An ionomer film can also be multilayer in structure to include a layer of a film processed at 40 degrees Celsius, which is dispersible in both hot and cold water, and a second layer based on a film processed at about 50 to 60 degrees Celsius, which does not disperse in cold water but disperses in hot water. Such films may be used to fabricate multi-component pouches for laundry applications. The multilayer structure may comprise two or more EAA films or may comprise a combination of EAA and non-EAA films.

In particular embodiments, the composition comprises an ethylene (meth)acrylic acid copolymer and a crosslinking agent. At least a portion of the carboxylic acid groups in the (meth)acrylic acid component may be neutralized with a base, resulting in a salt. For example, the carboxylic acid groups may be neutralized with a sodium cation to form a sodium salt. In another embodiment, the carboxylic acid groups may be neutralized with a potassium cation to form a potassium salt. The degree of neutralization may be between about 70 percent and about 95 percent, preferably between about 85 percent and about 95 percent, more preferably between about 90 percent and about 95 percent. A portion or all of the remaining (meth) acrylic acid may be ionically crosslinked. In other embodiments, the degree of neutralization may be about 85 percent and about 100 percent, preferably between about 90 percent and about 100 percent, and more preferably between about 98 percent and about 100 percent. Those skilled in the art will recognize appropriate methods for determining degrees of neutralization. See, e.g., U.S. Pat. No. 3,472,825. Increasing the degree of neutralization increases the dispersibility of the composition in low ionic strength media. The weight ratio of the ethylene to (meth)acrylic acid in the copolymer may be between about 50:50 and about 90:10, preferably between about 70:30 and about 90:10, and more preferably between about 75:25 and about 80:20.

The composition may be a solid composition, such as a film composition. In other embodiments, the composition may be a liquid composition, which may be applied as a coating or dried to create a film. The composition may not disintegrate (e.g., it may be insoluble or may not dissolve or disperse) when in contact with media having a pH of between about 8 and about 13 and comprising about 10 to about 95 weight percent water. The media may be in the form of, for example, a solution, a slurry, a dispersion, or a paste. Such media may be high ionic strength media, such as media having a salt content of greater than 3 percent, more preferably greater than about 7 percent. Examples of high ionic strength media include caustic, household bleach, seawater, synthetic seawater, and commercial laundry detergent. The composition may disintegrate in low ionic strength media, for example, media with a salt content of about 0 to about 2 percent (e.g., tap water, deionized water). Examples of low ionic strength media include deionized water, standard tap water, and the wash liquid of a laundry machine.

The crosslinking agent may include, for example, $Ca^{2+}$, $Mg^{2+}$, $Al^{3+}$, or $Zn^{2+}$. In addition to the crosslinking agent, the composition may include at least one additional additive, such as a plasticizing agent, a disintegrating agent, and/or a surfactant. The plasticizing agent may be a hydrophobic plasticizer, a hydrophilic plasticizer, or a combination thereof. For example, the plasticizing agent may be benzyl alcohol, UCON® LB-65 (a polyalkylene glycol (PAG)-based synthetic water insoluble lubricant), or T-BEP (tris (butoxyethyl) phosphate, an alkyl phosphate film forming aid and plasticizer), among others. The disintegrating agent may be, for example, acrylic acid, PVOH, a starch, cellulose, or a second co-polymer. The surfactant may be, for example, an anionic surfactant, a non-ionic surfactant, an amphoteric surfactant, or mixtures thereof. Examples of anionic surfactants include those known in the art, such as DOWFAX® 2A1 (alkyldiphenyloxide disulfonate), ammonium lauryl sulfate, sodium lauryl sulfate, sodium laureth sulfate. Examples of non-ionic surfactants include those known in the art, such as polyoxyethylene glycol alkyl ethers, polyoxypropylene glycol alkyl ethers, glucoside alkyl ethers, polyoxyethylene glycol octylphenol ethers, polyoxyethylene glycol alkylphenol ethers, glycerol alkyl esters, polyoxyethylene glycol sorbitan alkyl esters, and sorbitan alkyl esters. Examples of amphoteric surfactants include those known in the art, such as Ammonyx® LO (lauramine oxide).

In some embodiments, the film composition contacts, contains, surrounds, or encapsulates media to form a unit dose form, such as a pouch or a package. In other embodiments, two film compositions may be used to for the unit dose form. The first film composition may contact, contain, surround, or encapsulate a first media and the second film composition may contact, contain, surround, or encapsulate a second media. The film compositions may include an ethylene (meth)acrylic copolymer and a crosslinking agent, as discussed above. In some embodiments, the first and second film compositions may both comprise ethylene (meth)acrylic acid copolymers. In other embodiments, the first film composition may comprise an ethylene (meth) acrylic acid copolymer and the second film composition may comprise a non-ethylene (meth)acrylic acid copolymer.

The media may be a high ionic strength media and may have a pH of between about 8 and about 13. The media may comprise about 10 to about 95 weight percent water. In other embodiments, the media may be about 70 to about 95 weight percent water. The media may be substantially free of (e.g., less than 5 percent) co-solvents and/or organic plasticizers. The media may also be substantially free of substantial amounts of inorganic salts, but the media may include organic amine salts to provide the required ionic strength and alkalinity. Examples of such organic amine salts include mono-, di-, or tri-substituted alkylamine salts of carboxylic acid and fatty acid esters. The media may be a solution, such as a liquid laundry detergent. The media may comprise sodium silicate, potassium silicate, sodium carbonate, potassium carbonate, sodium hydroxide, or potassium hydroxide.

In additional embodiments, the composition may immobilize or encapsulate an additive to create small particles. The additive may then be released when the particles are placed in contact with low ionic strength media. Furthermore, a film composition could also be physically reduced in size via grinding or other means to provide a higher surface area encapsulated active ingredient. Similarly sized particles can also be produced from a liquid composition by methods known in the art, such as spray-drying and lyophilization.

EXAMPLES

TABLE 1

| Appendix | | |
|---|---|---|
| Benzyl alcohol | Film forming aid | Sigma Aldrich, St. Louis, MO |
| NaOH | (Sodium hydroxide) Neutralizer | Sigma Aldrich, St. Louis, MO |
| DOWFAX ® 2A1 | Anionic surfactant | The Dow Chemical Company, Midland, MI |
| KOH | (Potassium hydroxide) Neutralizer | Sigma Aldrich, St. Louis, MO |
| KP-140 | (Tributhoxy Ethyl Phosphate) Film forming aid | ICL-IP America Inc, St. Louis, MO |
| UCON LB-65 | Film forming aid | The Dow Chemical Company, Midland, MI |
| ZnO | Zinc oxide (Crosslinker) | Sigma Aldrich, St. Louis, MO |
| ZABC | Zinc ammmonia bicarbonate (Soluble crosslinking complex) | N/A |

Preparation of Precursors: Composition A and B

The functionalized polyolefin compositions A and B used for this example are mixtures of ethylene (meth)acrylic acid compositions (80 weight percent ethylene and 20 weight percent (meth)acrylic acid) neutralized with sodium hydroxide and potassium hydroxide, respectively. The degree of neutralization for A and B are 85 percent and 92 percent, respectively. The composition can be prepared by procedures known in the art. See, e.g., U.S. Patent Application No. 2011/0319521; PCT Published Application No. WO2011034883; and PCT Published Application No. WO2012082624. Composition A is a 24 percent aqueous composition neutralized with sodium hydroxide and having a pH of 10 and a Brookfield viscosity of 500 (Brookfield RVT, #2 spindle, 20 RPM, 25° C.). Composition B It is a 24 percent aqueous composition neutralized with potassium hydroxide and having a pH of 10 and a Brookfield viscosity of 500 (Brookfield RVT, #2 spindle, 20 RPM, 25° C.).

Aqueous Film Casting 15-25 grams of the composition is cast on a glass plate using a stainless steel draw down bar to provide a dried film with a target thickness of 76 μm. The plates are immediately transferred to a forced air oven and dried at 40 degrees Celsius for 45 minutes. The glass plates supporting the dried film are allowed to equilibrate at room temperature for several hours after film drying. Table 2 summarizes the film properties.

Example 1

The film composition of Example 1 consists of 100 percent Composition A. The film is not stable. It becomes brittle and breaks into pieces 12 hours after film formation.

Example 2

The film composition of Example 2 consists of 100 percent Composition B. The film is stable after room temperature equilibration. The film breaks in 22 seconds and it disintegrates completely in 30 seconds. A small amount of fine grit is obtained upon filtering the resulting composition using a 25 μm (0.025 mm) mesh screen.

Example 3

The film composition of Example 3 consists of 99.6 percent Composition A and is lightly crosslinked with a zinc oxide slurry (30 percent zinc oxide) resulting in 0.4 weight percent zinc oxide in the dried film. The film is stable after room temperature equilibration. The film breaks in 19 seconds and it disintegrates completely in 23 seconds. No grit is obtained upon agitation and filtering using a 25 μm (0.025 mm) mesh screen. This illustrates that the incorporation of a small amount of a crosslinking agent provides a stable and cold-water dispersible film without leaving any particulate or sediment.

Example 4

The film composition of Example 4 consists of 93.9 percent Composition A, 5.8 percent DOWFAX® 2A1, and is crosslinked with a soluble zinc oxide complex (ZABC). The soluble zinc oxide complex is prepared by reacting an equimolar amount of ammonium bicarbonate, zinc oxide, and aqueous ammonia. The addition of the anionic surfactant is necessary to provide divalent ion stability when a soluble complex crosslinker is used instead of slurry. The film is stable after room temperature equilibration. The film breaks in 26 seconds and it disintegrates completely in 27 seconds. A small amount of fine grit is obtained upon filtering the resulting composition using a 25 μm (0.025 mm) mesh screen.

Example 5

The film composition of Example 5 consists of the same ingredients as Example 4 and prepared in the same manner as Example 1 except that the film is dried at 45° C. The film is stable after room temperature equilibration. The film breaks in 31 seconds and it disintegrates completely in 37 seconds. A small amount of fine grit is obtained upon filtering the resulting composition using a 25 μm (0.025 mm) mesh screen. This illustrates that the increase in drying temperature leads to a slight increase in film disintegration time.

Example 6

The film composition of Example 6 consists of 89.2% Composition A, 5.5% DOWFAX® 2A1, 3.8% UCON® LB-65 and 1.5% of the soluble zinc oxide complex (ZABC). The film is prepared in the same manner as Example 1. The film is brittle with cracks. This illustrates the formation of a tightly crosslinked network as the level of crosslinking solution was increased.

Example 7

The film composition of Example 7 consists of 93.1% Composition B, 6.5% DOWFAX® 2A1, and 0.4% of the soluble zinc oxide complex (ZABC). The film is prepared in the same manner as Example 1. The film is stable after room temperature equilibration. The film breaks in 18 seconds and it disintegrates completely in 45 seconds. A small amount of fine grit is obtained upon filtering the resulting composition using a 25 μm (0.025 mm) mesh screen.

Example 8

The film composition of Example 8 consists of 89.5% Composition B, 6.2% DOWFAX® 2A1, 3.9% UCON® LB-65 and 0.4% of the soluble zinc oxide complex (ZABC). The film is prepared in the same manner as Example 1. The film is stable after room temperature equilibration. The film breaks in 24 seconds and it disintegrates completely in 29 seconds. A small amount of fine grit is obtained upon filtering the resulting composition using a 25 μm (0.025 mm) mesh screen.

Example 9

The film composition of Example 9 consists of 92% Composition A, 5.7% DOWFAX® 2A1, 1.9% Benzyl alcohol, and 0.4% of the soluble zinc oxide complex (ZABC). The film is prepared in the same manner as Example 1. The film is stable after room temperature equilibration. The film breaks in 35 seconds and it disintegrates completely in 58 seconds. A small amount of fine grit is obtained upon filtering the resulting composition using a 25 μm (0.025 mm) mesh screen. This illustrates that the addition of a slightly water soluble plasticizer such as benzoyl alcohol leads to an increase in film disintegration time. This result is consistent with the preferential plasticization of the ion-rich domains, which effectively disrupts ionic associations and leads to greater chain mobility and increased polymer chain intermixing. Such intermixing can improve film formation but compromise film dissolution and dispersibility.

Example 10

The film composition of Example 10 consists of 98.5% Composition A and 1.5% T-BEP. The film was prepared in the same manner as Example 1. The film deforms and breaks quickly with a burst time of 21 seconds and it disintegrates in 21 sections. The film disperses with no grit collected on the 25 μm (0.025 mm) mesh screen.

Example 11

The film composition of Example 11 consists of the same ingredients as Example 10. The film is prepared in the same manner as Example 1 except that it is dried at 60° C. The film is impervious and does not break or disperse in cold water. The film breaks and disperses only in hot water. This illustrates that the film formation temperature required in order to maintain cold water dispersibility should be lower than 60° C. and more preferably between 35 and 50° C.

Comparative Example 1

The film composition of Comparative Example 1 is a commercial modified PVOH-based film from MonoSol LLC sold under the tradename MonoSol® M8900. MonoSol® M8900 is a PVOH based thermoplastic film, dispersible in cold water and manufactured using MonoSol's proprietary solution cast technology. The film is completely dispersible with a burst time of 7 seconds and a disintegration time of 33 seconds.

Disintegration and Dispersibility Testing:

The disintegration and dispersibility testing is adapted from the Slide Frame Solubility Testing described in U.S. Pat. No. 7,745,517. The testing involves:
1. Cut films into approx. 3 inch×3 inch samples
2. Mount film in a slide frame and place in a 500 ml beaker filled with 400 ml water
   a. Hard water (500 ppm CaCO₃) at about 7-18 degrees Celsius for cold water or at about 50 degrees Celsius for hot water
   b. Soft water (0 ppm CaCO₃) at about 7-18 degrees Celsius for cold water or at about 50 degrees Celsius for hot water
3. Place beaker on magnetic stirrer and stir the water with a magnetic stir bar at 400 rpm to create a vortex.
4. Lower frame in water and secure with a clamp such that the stirring water pushes against the film.
5. The burst time is recorded when the film losses shape or breaks apart.
6. The disintegration time is recorded when the film losses is completely removed from the frame.
7. After disintegration, remove mount, stir for 10 minutes and examine the solution for undissolved grit, sediment or film fragments.

Disintegration Rating:
5=Completely dispersible
4=No residue on 25 um mesh screen
3=Fine grit on 25 um mesh screen
2=Film fragments on 25 um mesh screen
1=Not dispersible/impervious

TABLE 2

Film Properties & Cold Water Dispersibility Testing

| No. | Casting Temp. | Film Formation | Final Cold Water Disintegration | | |
|---|---|---|---|---|---|
| | | | Burst Time (sec) | Disintegration Time (sec) | Disintegration Rating** |
| Comparative* | N/A | Exc. | 7 | 33 | 5 |
| Example 1 | 40 C. | Poor | not tested | not tested | not tested |
| Example 2 | 40 C. | Good | 22 | 30 | 3 |
| Example 3 | 40 C. | Good | 19 | 23 | 4 |
| Example 4 | 40 C. | Good | 26 | 27 | 3 |
| Example 5 | 45 C. | Good | 31 | 37 | 3 |
| Example 6 | 45 C. | Poor | not tested | not tested | not tested |
| Example 7 | 40 C. | Good | 18 | 45 | 3 |
| Example 8 | 35 C. | Good | 24 | 29 | 3 |
| Example 9 | 40 C. | Good | 35 | 58 | 3 |
| Example 10 | 40 C. | Good | 21 | 21 | 4 |
| Example 11 | 60 | Good | Impervious | Impervious | 1 |

*MonoSol M8900 is a PVOH based thermoplastic film, dispersible in cold water and manufactured using MonoSol's proprietary solution cast technology.
**Disintegration Rating: 5 = Completely dispersible, 4 = No residue on 0.025 mm mesh screen 3 = fine grit on 0.025 mm mesh screen, 2 = Film fragments on 0.025 mm mesh screen, 1 = Not dispersible/impervious As illustrated in Table 2, freestanding water dispersible films with quick break and disintegration times are formed from compositions of the present disclosure. Films based on 100% Composition A are brittle and unusable compared to Composition B, which provided free standing films with good break and disintegration times. Films based on 100% Composition B; however, contain sediment in the form of grit which collected on a 25 μm mesh screen after disintegration. Slightly water soluble and polar plasticizers improve the film formation properties but result in increased disintegration time and sediment. On the other hand, hydrophobic plasticizers improve film formation without compromising film dispersibility, as shown by Example 10. This is consistent with the known plasticization mechanism on sulfonated polystyrene ionomers, where water soluble plasticizers preferentially plasticizes the ion-rich domains of ionomers while hydrophobic film forming additives only plasticize the continuous hydrophobic phase. See R. D. Lundberg, H. S. Makowski, and L. Westerman, in Ions in Polymers, A. Eisenberg, Ed., Advances in Chem. Ser., 187, American Chemical Society, Washington, D.C., 1980, Chap. 5. Slightly water soluble additives such as benzyl alcohol therefore effectively plasticize the ionic domains, hence disrupting ionic associations and resulting in greater chain mobility and increased polymer chain intermixing.

The films of the present disclosure are lightly crosslinked with a polyvalent cation such as ZnO. Unexpectedly, the use of a ZnO slurry is found to impart the right balance of film formation and film break and disintegration times as seen in Example 3. In contrast, Example 7, which was crosslinked with a soluble zinc oxide complex (ZABC), exhibits a relatively long disintegration time and contained sediment when filtered using a 25 μm mesh screen.

Additionally, the films formed at 60° C. do not disperse in cold water, although the films do disperse in hot water. At high temperature, there is sufficient thermal energy to disrupt ionic domains, which serve as physical crosslinkers. This dissociation leads to increase polymer chain mobility and particle coalescence resulting in a continuous hydrophobic phase. The film therefore exhibits great film formation properties but loss of cold-water dispersibility. Below 60° C., the ionic aggregates are still largely intact in a vitrified state and hence there is reduced polymer chain intermixing and particle coalescence.

Exposure Testing

Film strips are tested for their stability in high water-containing formulations. In the exposure testing, a 2 cm×4 cm film strip is immersed in a 20 mL vial containing the liquid detergent formulation of interest for 3 days. If the film is still intact after this time, 95% of the detergent solution is replaced with tap water in order assess whether the film maintains its dissolution and dispersibility properties.

As illustrated in Table 3, the comparative PVOH-based film MonoSol® 8900 softens when immersed in high water based liquid detergent. Upon replacement of the liquid detergent with tap water, the film does not break or disintegrate. This illustrates that MonoSol® M8900 is not compatible with current liquid laundry detergent formulations containing high water contents 70 weight percent or more and also containing inorganic neutralizing aids such as NaOH and KOH. The films compositions of Examples 6, 9, 10, 11 which contain film forming additives or plasticizers, as well as Example 1, which is based on 100% Composition A, all become soft when immersed in the high water containing liquid detergent. All these films did break and disintegrate when re-introduced to tap water after three days. The film compositions of Examples 4 and 5, which do not contain a plasticizer but are lightly crosslinked with an inorganic crosslinker, do not soften in the high water containing detergent. More importantly, these films also break and disintegrate when re-immersed in tap water. This illustrates the high stability and compatibility of the films with current liquid laundry detergents containing high water content as well as inorganic neutralizers.

All the films of the present invention remain intact upon immersion in a 5-10 percent sodium hypochlorite solution consisting of 90-95 weight percent by weight of water. Moreover, the films break and disintegrate upon re-immersion in tap water. On the other hand, the comparative film MonoSol® M8900 was completely dispersible in the 90-95 weight percent by weight of water sodium hypochlorite solution.

What is claimed is:

1. A unit dose form comprising:
   a film composition comprising an ethylene (meth)acrylic acid copolymer and a crosslinking agent,
   wherein at least a portion of the carboxylic acid groups in the (meth)acrylic acid component are neutralized, wherein the ratio of the ethylene component to the (meth)acrylic acid component is between about 50:50 to 90:10; and
   media having a pH of between about 8 and 13 and comprising about 10 percent to about 95 weight percent water in contact with and encapsulated within the film composition.

2. The unit dose form of claim 1, wherein the media is a liquid laundry detergent.

3. The unit dose form of claim 1, wherein the media comprises sodium silicate, potassium silicate, sodium carbonate, potassium carbonate, sodium hydroxide, and potassium hydroxide.

4. The unit dose form of claim 1, wherein the crosslinking agent comprises a divalent cation.

5. The unit dose form of claim 1, wherein the crosslinking agent comprises $Ca^{2+}$, $Mg^{2+}$, $Al^{3+}$, or $Zn^{2+}$.

6. The unit dose form of claim 1, wherein the film further comprises at least one additional additive.

7. The composition unit dose form of claim 6, wherein the additional additive is a plasticizing agent, a disintegrating agent, and/or a surfactant.

8. The unit dose form of claim 1, wherein the degree of neutralization is between about 70 percent and about 95 percent.

9. A unit dose form comprising:
   a first film composition comprising an ethylene (meth)acrylic acid copolymer and a crosslinking agent;

TABLE 3

Exposure Testing

| No. | Liquid Detergent** ~70 wt % Water/Co-Solvent | | Brine (30% NaCl, pH 11.5) ~70 wt % Water | | 5-10% Sodium Hypochlorite Solution*** (NaClO) 90-95% Water | |
|---|---|---|---|---|---|---|
| | Film Stability | Cold Water Disint. | Film Performance | Cold Water Disint. | Film Performance | Cold Water Disint. |
| MONO SOL ® M8900* | Soften | No | Intact | No | Dissolved | N/A |
| Example1 | Soften | Yes | Intact | Yes | Intact | Yes |
| Example 4 | Intact | Yes | Intact | Yes | Intact | Yes |
| Example 5 | Intact | Yes | Intact | Yes | Intact | Yes |
| Example 6 | Soften | Yes | Intact | Yes | Intact | Yes |
| Example 9 | Soften | Yes | Intact | Yes | Intact | Yes |
| Example 10 | Soften | Yes | Intact | Yes | Intact | Yes |
| Example 11 | Soften | Yes | Intact | Yes | Intact | Yes |

*MonoSol ® M8900 is a PVOH based thermoplastic film, dispersible in cold water and manufactured using MonoSol's proprietary solution cast technology.
**The liquid detergent used in this study is a commercial liquid laundry detergent, Purex ® Free & Clear (The Dial Corporation, Scottsdale, AZ).
***The liquid sodium hypochlorite solution used in this study is a commercial bleach solution, Clorox ® Washing Machine Cleaner (The Clorox Company, Oakland, CA).

While the invention has been described above according to its preferred embodiments, it can be modified within the spirit and scope of this disclosure. This application is therefore intended to cover any variations, uses, or adaptations of the invention using the general principles disclosed herein. Further, the application is intended to cover such departures from the present disclosure as come within the known or customary practice in the art to which this invention pertains and which fall within the limits of the following claims.

a second film composition comprising an ethylene (meth) acrylic acid copolymer and a crosslinking agent;

a first media in contact with and encapsulated within the first film composition, wherein the first media comprises about 10 percent to about 95 weight percent water and has a pH of between about 8 and 13; and a second media in contact with and encapsulated within the second film composition, wherein the second media comprises about 10 percent to about 95 weight percent water.

10. The unit dose form of claim 9, wherein the first media and the second media comprise about 70 to about 95 weight percent water.

11. The unit dose form of claim 9, wherein the first film composition disintegrates in cold water.

12. The unit dose form of claim 9, wherein the second film composition does not disintegrate in cold water.

13. The unit dose form according to claim 1, wherein the crosslinking agent is zinc oxide.

14. The unit dose form according to claim 1, wherein the crosslinking agent comprises from about 0.3 to 0.5 weight percent of zinc oxide.

* * * * *